UNITED STATES PATENT OFFICE.

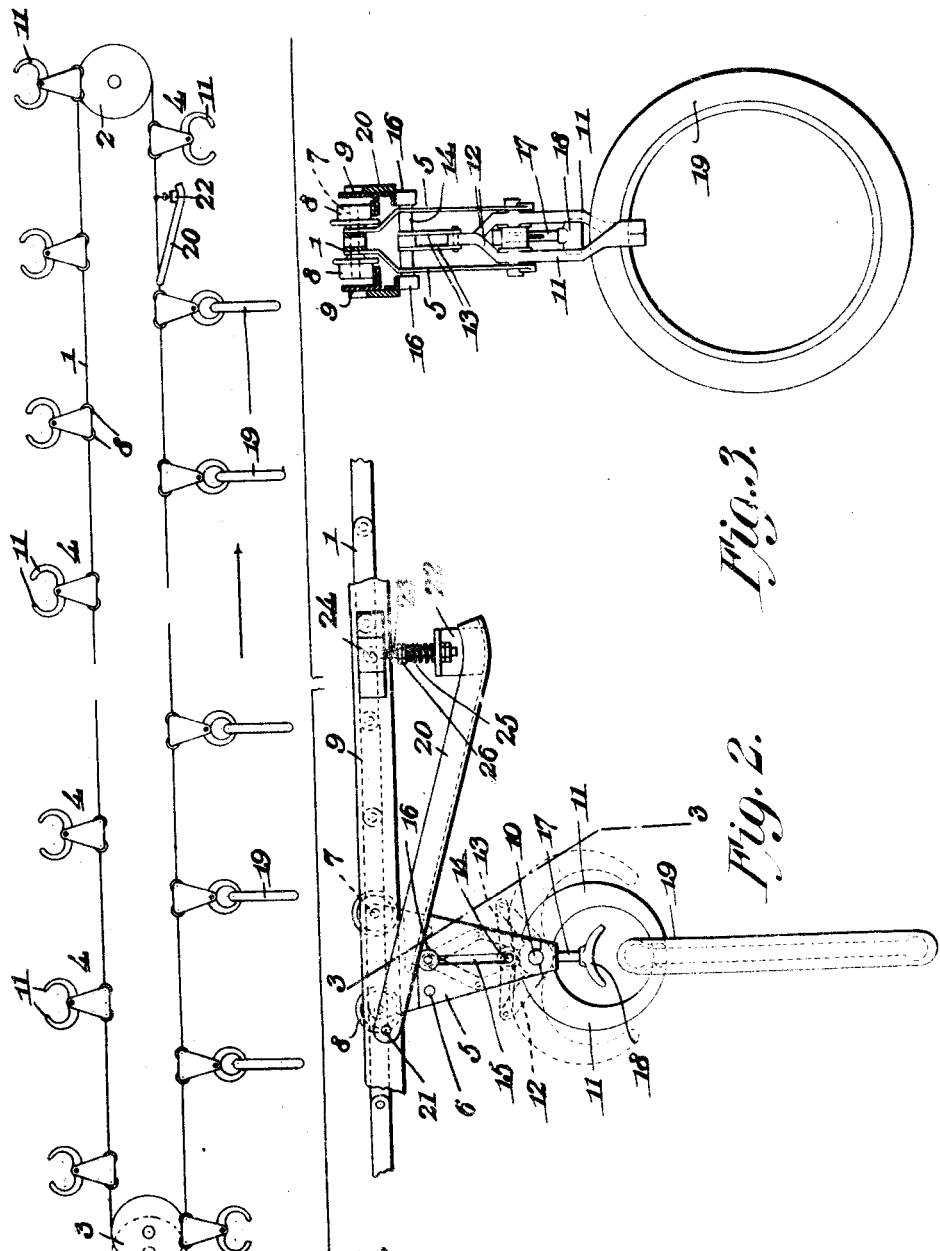

GEORGE DANIEL FRANCISCO, OF COLUMBUS, OHIO, ASSIGNOR TO THE JEFFREY MANUFACTURING COMPANY, OF COLUMBUS, OHIO, A CORPORATION OF OHIO.

CONVEYER.

1,132,713.  Specification of Letters Patent.  Patented Mar. 23, 1915.

Application filed December 9, 1912. Serial No. 735,755.

*To all whom it may concern:*

Be it known that I, GEORGE DANIEL FRANCISCO, a citizen of the United States, residing at Columbus, in the county of Franklin and State of Ohio, have invented certain new and useful Improvements in Conveyers, of which the following is a specification, reference being had therein to the accompanying drawing.

The invention relates to conveyers adapted for the carrying of articles which are manually supplied thereto at one place and which are released therefrom, preferably automatically, at another place.

The conveyer is particularly adapted for use in connection with the conveying of rubber tires from one place to another in a tire factory. The conveyer is provided with tongs which are normally open, and an article such as a rubber tire, may readily be moved up between the points of the tongs and, in coming in contact with a push rod, automatically cause the tongs to come together and securely hold the tire. A cam unloading device is positioned at any desirable point and automatically causes the points of the tongs to separate and release the tire. While particularly adapted for this particular class of work, the device may be used with any articles where two arms or points on coming together engage either with one another or with the article itself and securely hold it. One of the objects of the invention is to provide a conveyer of the sort above referred to with an improved automatic releasing means.

Another object is to provide in combination with the main chain or its equivalent a series of carriers or grapples each of which is adapted to be closed upon the movement of the article to be carried into or above its normal position.

A further object is to provide in combination with the chain and the grapples an article-controlled grapple-closing means and a motion-controlled grapple-opening means.

Still other objects will be apparent from the following specification.

Referring to the drawings, Figure 1 is a diagrammatic view of a conveyer embodying my invention. Fig. 2 is a detail side elevation of the conveyer tongs and unloading cam, the tongs being shown in dotted lines in their open position. Fig. 3 is a section on the line 3—3 of Fig. 2.

In the drawings the numeral 1 indicates a conveyer chain passing around the sprocket wheels 2 and 3 diagrammatically illustrated in Fig. 1. A series of trolley carriers indicated in general by the numeral 4 are secured at intervals to the chain and each are adapted to grasp an article at one end of the chain travel and automatically discharge it at any suitable point.

The trolley carriers are made up of two vertical triangular shaped side plates 5 secured together by spacing bolts 6. The triangle is inverted and the two upper corners are bent inward and secured to the conveyer chain by pins 7 which serve both as chain pintles and axles for the track wheels 8. The track wheels 8 roll on a double trackway 9 supported in any suitable manner. A hinge pin 10 extends through the apex of the triangular trolley carrier and pivotally carries two downward opening oppositely faced tongs 11. The upper ends of the tongs 11 are extended in the form of arms 12 beyond the hinge point and are connected together by the toggle links 13 joined by the pin 14. The pin 14 extends outward through slots 15 in the side plates in the trolley carrier and has secured on its ends the two rollers 16. A vertically arranged rod 17 passes through an opening in the hinge pin 10 and at its lower end carries the shoe or push plate 18. A nut is threaded upon the upper end of the rod 17 above the hinge pin 10 so as to prevent the rod dropping down through the opening. In order to hold the shoe or push plate 18 in proper position, it is either keyed or guided by means of a pin and slot with the opening in the hinge pin 10. The weight of the tongs or hooks is sufficient when the toggle is unlocked to cause their points to be held in contact with each other. On the other hand, when the toggle pin 14 is pushed downward so as to place it on the horizontal plane below the pins connecting the links 13 and arms 12, the tongs will then be forced into their outer disengaged position and will be held there by the toggle lock. The push plate 18 and rod 17 are provided so that in loading the tongs a tire 19 or similar article may be pushed upward against this plate thereby forcing the toggle lock open and upward allowing the tongs to drop with their own weight and contact with each other. The tire will then be securely held within the tongs and ready for carrying to the discharge point.

It will be observed that the rod 17 and the plate 18 are not permanently connected with the toggle links or with the pin 14. The parts 17 and 18 are therefore not moved except when engaged by the tire or other article and consequently the tongs are left free to move freely under the action of gravity when released. They are not forced to carry the weight of the rod and plate or to overcome the friction or inertia thereof.

The discharging cam comprises two angle irons 20 pivoted on pins 21 to the outer sides of the track ways and downwardly inclined in the direction of chain travel. Their lower ends are riveted to brackets which have horizontally extending flanges through which pass bolts 23 pivotally connected at their upper ends to the track ways. Springs 25 on the bolts and adjustable nuts 26 permit upward movement of the lower ends of the cams. The cams are so positioned that when a trolley carrier approaches a section of the track on which the cam is mounted, the rollers 16 carried by the toggle pivot 14 will engage the lower edges of the angle 20 of the cams and be forced downward. The forcing downward of the toggle pivot 14 causes the tongs to open and release the tire or other article which may be held within its embrace. The spring mounting of the lower ends of the cams 20 insures the forcing of the pivot pin 14 to its lowermost position without, however, causing any danger of binding or cramping of the parts. There will be minor differences between one carrier and another as to the position of the pin, the length of the slot, etc., and this resilient mounting of the cams insures uniform action of all of the carriers and grapples notwithstanding these minor differences.

The operation of the trolley carrier is simple to the extreme, and the closing of the tongs can be performed very rapidly. This permits the placing of the carriers very close together on the conveyer chain and greatly increases the capacity of the conveyer system.

What I claim is:—

1. The combination of a traveling endless chain, means for guiding the said chain in a fixed path, a series of carriers secured to the chain at regular intervals, a pair of downward-opening tongs pivoted on each carrier and adapted to close automatically, a device on each carrier supplemental to the tongs for locking them open, and a trip on each carrier between the tongs and supplemental to them and serving to release the locking device and permit the tongs to close when engaged by an article thrust upward between the tongs at right angles to the lines of travel.

2. The combination of a traveling endless chain, means for guiding the said chain in a fixed path, a series of carriers secured to the chain at regular intervals, a pair of downward-opening tongs pivoted on each carrier and adapted to close automatically, a device on each carrier supplemental to the tongs for locking them open, and a trip on each carrier between the tongs and supplemental to them and serving when engaged by an article thrust upward between the tongs to release the locking device and permit the tongs to close and support the article, the lower article engaging surface of the trip being considerably above the position of the said article when supported by the tongs.

3. The combination of a traveling endless chain guided for movement in a fixed path, a series of carriers secured to the chain at regular intervals, a pair of oppositely swinging downward-opening tongs pivoted to each of the carriers and automatically movable into their lower closed positions, a lock on each carrier for holding the tongs in their separated open positions, and means dependent upon the movement of the carriers for successively separating the tongs of the several pairs, the said means successively engaging the several locks positively and forcing them into their operative positions.

4. The combination of a traveling endless chain guided for movement in a fixed path, a series of carriers secured to the chain at regular intervals, a pair of oppositely swinging downward-opening tongs pivoted to each of the carriers and automatically movable into their lower closed positions, a lock on each carrier for holding the tongs in their separated open positions, means dependent upon the movement of the carriers for successively separating the tongs of the said pairs and for successively moving the said locks into their operative positions, and a lock releasing trip on each carrier engageable by an article to be carried when thrust upward between the tongs.

5. The combination of a traveling endless chain guided for movement in a fixed path, a series of carriers secured to the chain at regular intervals, a pair of oppositely swinging downward-opening tongs pivoted to each of the carriers and automatically movable into their lower closed positions, a pair of links on each carrier supplemental to the tongs for moving them and for locking in their separated open positions, means dependent upon the movement of the carriers for successively actuating the said pairs of links to separate the tongs of the said pairs and lock them in their separated open positions, and a releasing trip on each carrier engageable by an article to be carried when thrust upward between the tongs.

6. The combination of a traveling endless chain guided for movement in a fixed path, a series of carriers secured to the chain at regular intervals, a pair of oppositely swinging downward-opening tongs pivoted to each of the carriers and automatically movable into their lower closed positions, a pair of links on each carrier supplemental to the tongs for moving them and for locking in their separated open positions, means dependent upon the movement of the carriers for successively actuating the said pairs of links to separate the tongs of the said pairs and lock them in their separated open positions, and a releasing trip on each carrier engageable by an article to be carried when thrust upward between the tongs, the said trip when disengaged remaining in its lowermost position irrespectively of the movement of the said links.

7. The combination of a traveling endless chain guided for movement in a fixed path, a series of carriers secured to the chain at regular intervals, a pair of oppositely swinging downward-opening tongs pivoted to each of the carriers and automatically movable into their lower closed positions, a lock on each carrier for holding the tongs in their separated open positions, a cam for successively separating the tongs of the several pairs and for successively moving the said locks into their operative positions, and a resilient means for supporting the cam whereby it is permitted to yield after the said locks have reached their extreme positions.

8. In an article carrying device for a conveyer mechanism, the combination of a frame, oppositely disposed tongs pivoted intermediate their ends in the frame, a vertically slidable pin in the frame, links connecting said pin with the upper ends of the tongs, and means within the area inclosed by the tongs for forcing upward the said pin when it is at its lowest position in the frame.

9. In a conveyer mechanism, the combination of a traveling endless chain, means for guiding the said chain in a fixed path, a frame secured to the chain, oppositely disposed tongs connected with the frame and adapted to encircle the article to be carried, a transverse pin vertically slidable in the frame, toggle links connecting the said pin and the tongs, the ends of the said transverse pin extending beyond the frame, and a cam positioned adjacent the line of travel to coöperate with the ends of the pin and force it downward to its lowermost position.

10. In a conveyer mechanism, the combination of a traveling endless chain, means for guiding the said chain in a fixed path, a frame secured to the chain, oppositely disposed tongs pivoted intermediate their ends in the frame, a transverse pin vertically slidable in the frame, toggle links connecting the pin with the upper ends of the tongs, a cam adapted to engage with the pin and force it to its lowest position, and means within the area inclosed by the tongs for pushing the said pin upward when in its lowest position.

11. In an article carrying device for a conveyer mechanism, the combination of a frame comprising two vertically arranged plates spaced from each other, a transverse pintle passing through the lower ends of the plates, a pair of oppositely disposed tongs journaled intermediate their ends upon the said pintle, a transverse pin vertically slidable in slots formed in the plates, toggle links connecting the said pin with the upper ends of the tongs, the said pin extending outward beyond the plates, and a vertically movable rod extending through an opening in the pintle and adapted on upward movement to contact with the toggle pin to force it upward.

In testimony whereof I affix my signature, in presence of two witnesses.

GEORGE DANIEL FRANCISCO.

Witnesses:
 RAY F. SMITH,
 DUDLEY T. FISHER.